United States Patent
Cator et al.

(10) Patent No.: US 9,510,602 B2
(45) Date of Patent: Dec. 6, 2016

(54) SYSTEM AND METHODS FOR CONTINUOUS PRODUCTION OF PROTEINACEOUS PATTIES DRESSED WITH FOOD GRADE PARTICULATE

(71) Applicant: Cardinal Meat Specialists Limited, Brampton (CA)

(72) Inventors: Brent J. M. Cator, Etobicoke (CA); John Pound, Mississauga (CA); Frank Florindo, Mississauga (CA); Kelly Moriyama, Richmond Hill (CA); Carlos DaSilva, Mississauga (CA)

(73) Assignee: Cardinal Meat Specialists Limited, Brampton (CA)

( * ) Notice: Subject to any disclaimer, the term of this patent is extended or adjusted under 35 U.S.C. 154(b) by 51 days.

(21) Appl. No.: 14/269,570

(22) Filed: May 5, 2014

(65) Prior Publication Data

US 2014/0335247 A1 Nov. 13, 2014

Related U.S. Application Data

(60) Provisional application No. 61/820,442, filed on May 7, 2013.

(51) Int. Cl.
*A22C 7/00* (2006.01)

(52) U.S. Cl.
CPC ............. *A22C 7/0076* (2013.01); *A23L 13/62* (2016.08)

(58) Field of Classification Search
CPC ....... A23L 1/3172; A22C 7/0076; A24C 5/18; A24C 5/39

See application file for complete search history.

(56) References Cited

U.S. PATENT DOCUMENTS

| | | | |
|---|---|---|---|
| 1,918,739 A * | 7/1933 | Chapman | C10B 1/04 202/254 |
| 1,948,021 A * | 2/1934 | Burton | F23K 3/00 222/226 |
| 4,716,821 A | 1/1988 | Mally et al. | |
| 4,832,970 A | 5/1989 | Mally et al. | |
| 5,022,888 A | 6/1991 | Lindee | |
| 6,932,998 B2 | 8/2005 | LaBruno et al. | |
| 7,568,901 B2 * | 8/2009 | Le Paih | A22C 7/0007 425/106 |

FOREIGN PATENT DOCUMENTS

| | | |
|---|---|---|
| CA | 2151281 A1 | 6/1994 |
| CA | 2021432 | 9/2000 |
| CA | 2604103 A1 | 11/2006 |
| WO | 94/14036 | 6/1994 |

OTHER PUBLICATIONS

International Application No. PCT/CA2014/050429, International Search Report, dated Jul. 17, 2014.
International Application No. PCT/CA2014/050429, Written Opinion of the International Searching Authority, dated Jul. 18, 2014.

\* cited by examiner

*Primary Examiner* — Jianying Atkisson
(74) *Attorney, Agent, or Firm* — Cahn & Samuels, LLP

(57) ABSTRACT

Provided herein is a continuous production line for a dressed proteinaceous patties with a solid food grade particulate using a coordinated volumetric toothed dispensing cylinder and variable speed conveyor for precisely controlled introduction of the particulate to a stream of proteinaceous material which is then formed into a patty.

10 Claims, 3 Drawing Sheets

SYSTEM AND METHODS FOR CONTINUOUS PRODUCTION OF PROTEINACEOUS PATTIES DRESSED WITH FOOD GRADE PARTICULATE

INVENTIVE FIELD

This invention relates to an improved manufacturing line that on a continuous basis at industrial speeds produces proteinaceous patties dressed with precise amounts of various food grade or combined food grade particulates. This patty stream dressing eliminates intermittent deposition by slicing, shaving, or pumping food grade particulates onto a patty.

BACKGROUND

Co-extrusion of liquid ingredients in the food industry is a conventional practice but a need exists for a system capable of for consistently producing proteinaceous patty products dressed with a food grade particulate and satisfying all food processing sanitary and regulatory requirements. To achieve safe dressed patty production economically, the dressed patty production line should operate continuously at commercially acceptable production rates.

SUMMARY OF INVENTION

It is an object of the present invention to provide an economical and efficient dressed patty production system.

Another object of the invention is to reduce the cost of equipment and labor associated with multi-component proteinaceous patty formation.

These and other objects are satisfied by a particulate food product dispensing assembly comprising: a particulate food product reservoir; a particulate food product hopper with a filling port and a dispensing port and a volumetric dispensing cylinder disposed in particulate communication with the dispensing port; particulate food product conduit extending between said reservoir and the food product dispensing hopper for introduction of particulate food product through the filling port; a solenoid and compressed air source connected to and in pneumatic communication with the particulate food product conduit; a first low level sensor for detecting a first level of particulate food product contained in the hopper; a second high level sensor for detecting a second level of particulate food product contained in the hopper; a hopper volume control system including a dispensing cylinder rotational speed control element a signal communication receiver which upon receipt of a signal from the first low level sensor deactivates the solenoid to cause transfer of the particulate food product from the reservoir to the hopper until receipt of a signal from the second sensor to maintain generally uniform particulate food product weight pressure on volumetric toothed dispensing cylinder and discharge of a precise particulate food product volume from the dispensing port; and a variable speed conveyor with a first end underlying said volumetric dispensing port and a second end for discharging particulate food product thereon, said conveyor being in signal communication with said hopper volume control system to synchronize the conveyor speed with the particulate food product discharge volume.

Further objects are satisfied by a device and method for forming a dressed patty, comprising: a first proteinaceous food product dispensing hopper providing a stream of proteinaceous food product; a constant speed conveyor for receiving said stream of first proteinaceous food product travelling in a select direction and at a select speed; a particulate food product dispensing hopper with a metering volumetric dispensing cylinder, a first low level sensor and a second high level sensor for detecting the level of particulate food product in the hopper to maintain a substantially constant weight pressure thereof on the volumetric dispensing cylinder, said sensors being connected to a hopper volume control system including an ingredient conduit, an in-line vacuum suction module, a solenoid and a compressed air source to force to the ingredients through the conduit to the hopper when the particulate food product in the hopper is detected at level below a set minimum; a variable speed conveyor with a first end and a second end where said second hopper is in dispensing communication with said first end for receiving the particulate food product dispensed therefrom and the second end is positioned above said constant speed conveyor to discharge the particulate food product directly onto said stream of said first proteinacous food product; and a patty forming device for receiving said stream of first proteinaceous food product bearing said particulate food product.

Still other objects are satisfied by a device and method for forming a dressed stuffed proteinaceous patty, comprising: a first proteinaceous food product dispensing hopper providing a first and a second stream of proteinaceous food product; an upper conveyor belt traveling in a select direction at a select speed for receiving said first stream of first proteinaceous food product; a lower conveyor belt for receiving said second stream of first proteinaceous food product travelling parallel to, in the same select direction, and at the same select speed of the upper conveyor; a filling particulate food product dispensing hopper, said second hopper being in dispensing communication with a variable speed conveyor belt with a first end and a second end where the first end is positioned to receive the filling particulate food product dispensed from the second hopper and the second end is positioned between said upper and lower conveyors to discharge the filling particulate food product directly onto said second stream of said first proteinacous food product; and a patty forming device for receiving said first stream of said first proteinaceous food product and said second stream of said proteinaceous food product bearing said filling particulate food product where said first and second streams converge and are formed into an integrated patty containing said filling particulate food product.

In simplest terms, the invention herein provides a continuous production line for precisely controlled introduction of a solid particulate food product to a stream of proteinaceous material, e.g., ground hamburger, turkey or soya, which is then formed into a patty.

For definitional purposes and as used herein "connected" connotes operationally connected and includes physical, whether direct or indirect, permanently affixed or adjustably mounted, as for example, the volume sensors are electronically connected to the hopper volume control system by wire or wirelessly. Thus, unless specified, "connected" is intended to embrace any operationally functional connection.

As used herein, the word "cylinder" or "cylindrical" is not strictly limited to a geometry with a circular cross-section so long as it is rotatable about an axis and further may be of a shorter length where it more resembles a wheel. The word is intended to embrace a structure possessing a rotatable periphery that substantially journals within a surrounding structural element.

As used herein the word "patty" or "patties" is not strictly limited to a geometry with a circular form but is intended to embrace any conventional portion controlled shape or configuration that can be molded from a stream of proteinaceous material such as a square, block, or loaf.

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawing, and which is shown by way of illustration to the specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

GENERAL DESCRIPTION OF THE INVENTION

Figure 1:
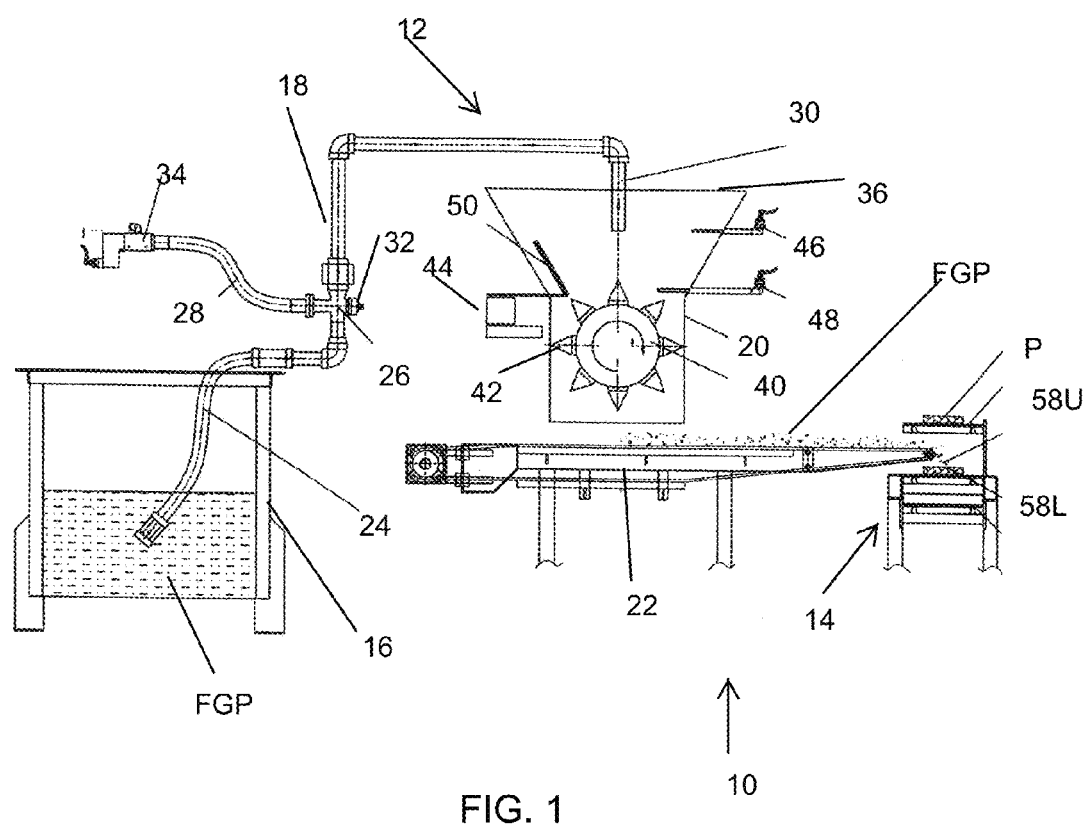
FIG. 1 is a schematic representation of an assembly according to an embodiment of the invention for dispensing a precise amount of food grade particulate onto a stream of proteinaceous food product.

The present invention relates to a line system that dresses ground proteinaceous food product, e.g., meat, fish, dairy or vegetable which is then formed into patties from a continuous stream with a precise amount of a food grade particulate (FGP) or combination of food grade particulates deposited on the stream in an efficient controlled manner. The dressed patty system 10 includes food grade particulate dispensing assembly 12 and a proteinaceous patty forming line 14.

The FGP assembly 12 comprises a food grade particulate reservoir 16 that may or may not be subject to thermal control to maintain the temperature of the contained product, i.e. a refrigeration system to maintain the particulate in a frozen or near-frozen state. The food grade particulate is conveyed from the reservoir 16 to a volumetric hopper 20 by feed line 18. The hopper 20 overlies a variable speed conveyor 22 that discharges deposited particulate onto a stream of proteinaceous material on patty forming line 14.

Compressed air and vacuum are utilized to pump the particulate food product from the reservoir 16 to the input opening 36 at the top of the hopper 20. The feed line 18 includes reservoir intake tube 24 which is connected at a T connector 26 with a compressed air input line 28 and particulate output line 30. The intake tube 24 may include at its entry an adjunct such as an electrically driven intake screw to promote uniform introduction and conveyance of the particulate contained in the reservoir 16 into and through the feed line 18. The T connector 26 incorporates a vacuum venturi valve 32 for generating a vacuum in the intake tube 24 and particulate output line 30 created when the compressed air is provided through air input line 28. The air flow in line 28 is controlled by solenoid 34 which, when open, moves the particulate food product by vacuum from the reservoir 16 to the hopper 20.

Flow of the particulate through the hopper 20 results from gravity and mechanically controlled dispensing. The hopper 20 includes input opening 36, dispensing opening 38, a cleated dispensing cylinder 40 featuring a plurality of radially projecting vanes or teeth 42, associated with the dispensing opening, a mechanically driven interior scraper 44, high volume sensor 46, and low volume sensor 48.

As indicated above, the hopper 20, functioning as a volumetric dispenser, is positioned over the variable speed conveyor 22. Precise amounts of the food grade particulate is metered out of the volumetric feeder 20 depending on the speed of rotation of the cylinder 40 which is controlled by a linkage such as a chain drive to an electric motor (not illustrated) that is synchronized with the conveyor 22. The placement of the cleats/teeth 42 on the cylinder surface is selectable to correspond to a particular particulate and its dispensing characteristics.

Furthermore, the cleats/vanes/teeth 42 of the volumetric cylinder 40 may be manually or automatically adjustable to vary the radial length or pitch thereof and enable modification of the respective gap spacing therebetween and to maintain precise spacing from the interior wall of dispensing opening 38. For example, by changing the outer pitch a single cylinder usable to accommodate accurate portion of different size particulate ingredients exhibiting different shapes and properties such as shaved cheeses, chopped mushrooms and diced peppers. In the case of substantial differences or when the teeth 42 are not adjustable, the invention contemplates convertibility by permitting substitution of one particular cylinder for another with different sized teeth that are exhibit more acceptable dispensing characteristics for different particulate sizes, e.g., ⅜, ½, ¾ cubic inch (4.1-8.2 cc).

Within the hopper, the sensors 46 and 48 provide an automatic level control system inside the product hopper 20. To insure uniform dispensing, it is very important to maintain a substantially equal, constant FGP product weight pressure over the metering volumetric cylinder 40 which results in a far better portion control of product dispensing. The sensors may be incorporated in the body of the hopper 20, as illustrated, or may comprise a pair of probes of differing length depending from the opening 36. Signals transmitted from the sensors activate or deactivate the solenoid 34 in air input line 28.

Above the discharge opening 38, the interior perimeter of the hopper 20 is scraped to eliminate bridging of the product in the hopper 20 above the volumetric cylinder 40 and minimize clumping that may occur during operation. The scraper unit 44 features an angled, upwardly projecting, rigid blade 50 affixed to a mounting 52 that itself is secured through an annulus in the hopper 20 to encircling gearing that is driven by a connected electric motor. The hopper scraper blade 50 is driven by a VDF (verifiable speed drive) to permit speed adjustment as it circles about the entire hopper interior perimeter. The speed selection can be automated but preferably is made by the operator, based on experience, to provide the proper degree of agitation conforming to the particular requirements of the particulate product size, density, temperature etc.

Most of the operations of assembly 12 are controlled by an associated PLC (Programmable Logic Controller) (not illustrated). The PLC is in signal communication with the various assembly components to control dispensing of the food grade particulate volume in the hopper and discharge to the patty line 14. The PLC coordinates and synchronizes operations of the various individual hardware elements to control the proper sequence, time, and speeds for line optimization and line speeds. The PLC program instructions are essentially recipe, ingredient based as determined by various field tests. For example, when product #1 is entered by the operator, hopper cylinder is automatically set to 21 HZ and the conveyor speed to 18 HZ. This method of metering out the particulate or combined particulates allows the particulate material to maintain its physical integrity without squeezing it through a metering pump or forming a log. Thus the pre-programmed instructions achieve proper fill weights and particulate distribution to correspond to a particular product code which is entered by an operator. In this manner, uniformity of particulate dispensed on the conveyor 22, whether the particulate is sliced, diced, chopped or shaved is precisely controlled for discharge onto a stream of proteinaceous material on proteinaceous patty line 14

Figure 7:
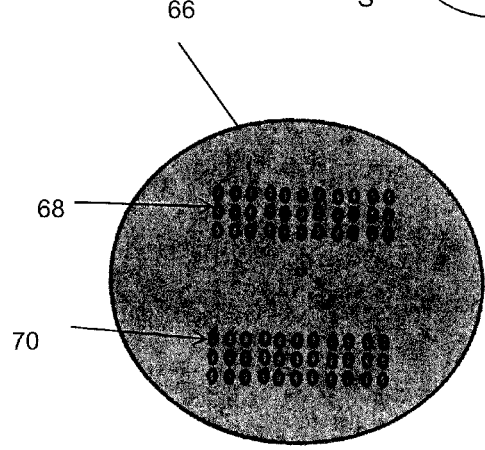
FIG. 7 top view of a double slotted grind plate for use in connection with the embodiment of FIG. 3.
Figure 8:
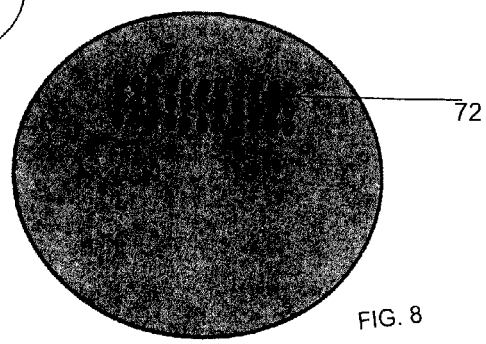
FIG. 8 top view of a single slotted grind plate for use in connection with the embodiment of FIG. 5.

Turning now to FIGS. 2-6, they depict a Food Grade Particulate dressing line 12 positioned to intersect proteinaceous patty line 14. The patty line 14 features a proteinaceous "meat" product pump grind unit 54 such as those available from Handtmann (Germany), Risco (Italy), and Reiser (Massachusetts, US). The meat pump grind unit 54 dispenses proteinaceous material P through a select single or double slotted grind plate 56 (See FIGS. 7 and 8) onto one end of a continuous speed conveyor belt 58. The conveyor belt 58 terminates at a patty former infeed belt 60 that moves the dressed proteinaous material into a patty former 62. The patty former 62 may be of conventional design such as a Nijal System described in U.S. Pat. No. 7,568,901 B2, Aug. 4, 2009, the subject matter of which is incorporated herein by reference. Formed dressed patties designated DP exit the patty former on and exit belt 64 to a further processing or packaging station, as desired.

Figure 2:
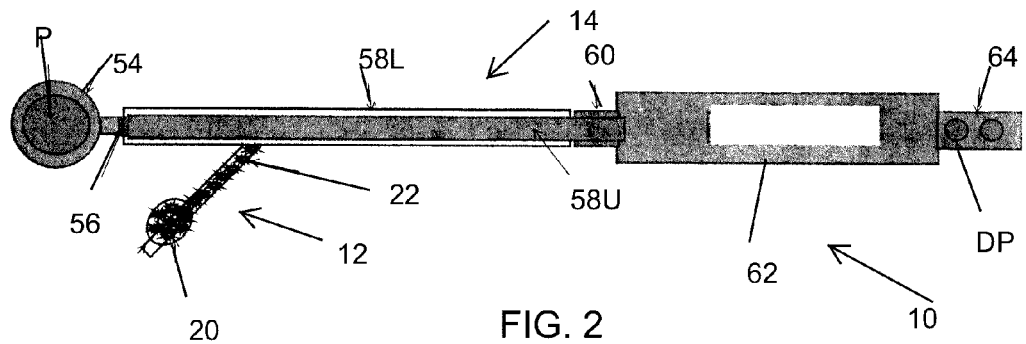
FIG. 2 is a schematic top view of a patty dressing system according to an embodiment of the invention.
Figure 3:
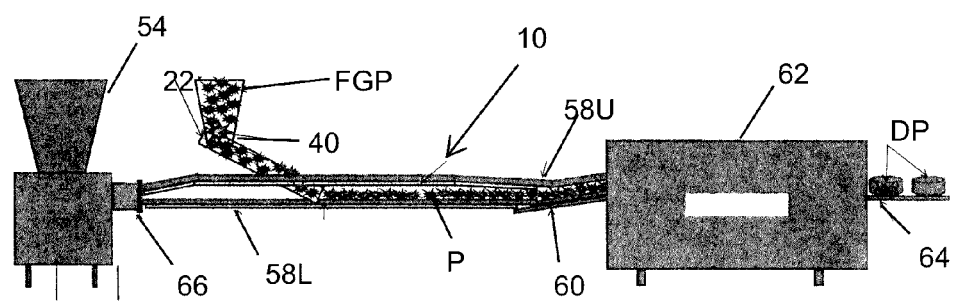
FIG. 3 is a schematic side view of an embodiment depicted in FIG. 2 for production of stuffed patties.
Figure 4:
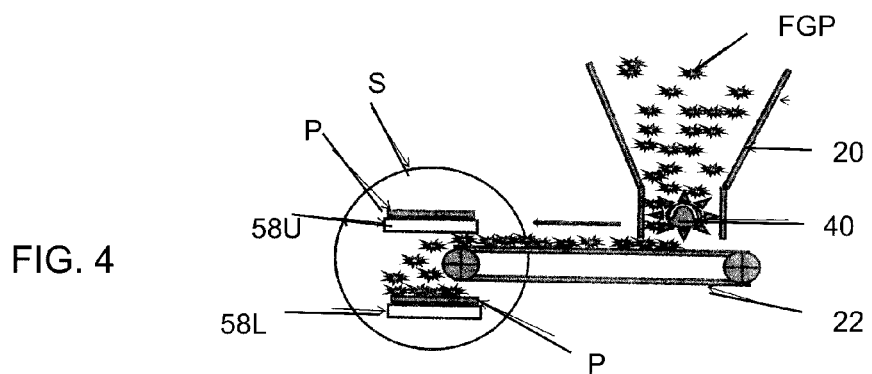
FIG. 4 is a partial cutaway schematic side view of the particulate food product dressing subassembly line and the interface with the proteinaceous patty subassembly line 14 in a dual stream embodiment of FIG. 2.

Turning to the stuffed patty version of the invention illustrated in FIGS. 2-4, it relies on a method of splitting a single stream of proteinaceous material into upper and lower streams from a single grinder head. To split a single stream of proteinaceous material into a top and bottom streams, a double slotted grinder plate 66 (See FIG. 7) was developed. The double slotted plate 66 features a discharge slot array 68 at the upper portion of the plate and a corresponding discharge slot array 70 formed at the lower portion of the plate. The selection of particular dimensions of the slots/holes and the configuration of the arrays are governed by the particular requirements of the recipe. The double slotted grind plate 66 thereby produces two streams of proteinaceous material out of a single grinder head which are then deposited respectively onto synchronized, parallel patty line conveyors 58U (upper) and 58L (lower).

To create a patty stuffed with food grade particulate, as schematically indicated in FIG. 4, the food grade particulate is discharged from conveyor 22 onto the lower stream of proteinaceous material carried by conveyor 58L at the dressing station S which then moves into the patty forming machine 62. At the patty forming unit 62, the two streams converge so that the upper stream of proteinaceous material then covers the bottom stream dressed with the food grade particulate. In this manner, the patty forming unit discharges stuffed patties containing the food grade particulate sandwiched between the upper and lower streams of proteinaceous material.

Figure 5:
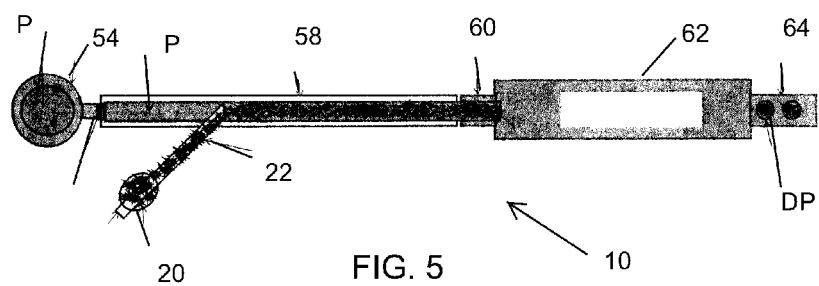
FIG. 5 is a cutaway schematic side view of the particulate food product dressing subassembly line and the interface with a single stream proteinaceous patty subassembly line 14 according to the a further embodiment of the invention.
Figure 6:
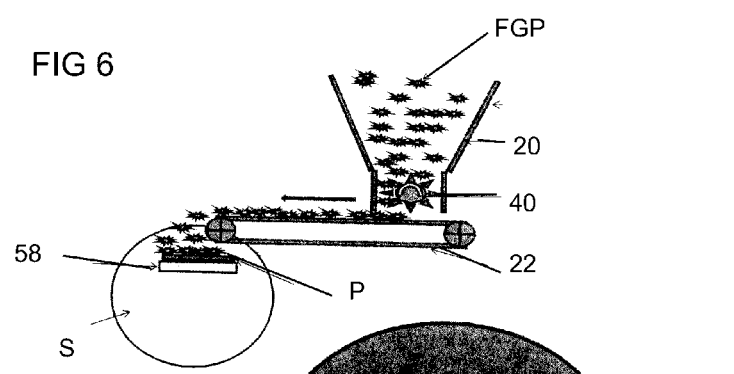
FIG. 6 is a partial cutaway schematic side view of the particulate food product dressing subassembly line of the stuffed patty single stream embodiment of FIG. 5.

Referring to FIGS. 5 and 6, the depicted arrangement is for production of top dressed patties. In this case the systems are essentially identical but only a single slotted grind plate 72 is used and the proteinaceous material deposited as a single stream onto a single patty line conveyor. Of course, if desired, the above-described double stream conveyor line can be used where the single patty stream is deposited only on the lower conveyor 58L. The result is the proteinaceous material P covered with the top dressing particulate or combined particulates FGP which is conveyed to the in feed belt 60 of the patty former 62 to form the top dressed patties of desired shape and size.

For purposes of illustration, an exemplary operation of the invention is now provided. After introducing ingredients corresponding to a particular recipe, the operator selects auto-mode on the PLC control panel, and presses start. The PLC issues a sequence of command signals to the respective hardware. At first, the level sensors 46 and 48 do not detect product in the hopper. The PLC signals the solenoid 34 to open and communicate air to the T connection 26 and venturi valve 32 to generate a vacuum. The vacuum causes the food grade particulate to move from the reservoir 16 to the hopper 20 via output line 30. Once the high level is detected by sensor 46, the PLC deactivates the solenoid 34. The electric motors connected to the dispensing cylinder 40 and the variable speed conveyor 22 are activated. Although not necessary, to substitute operator judgment, the PLC may also be in signal communication with the patty forming line components, i.e. the meat pump 54, the patty line conveyor 58, the patty former input conveyor 60 and the patty forming unit 62 in order to coordinate start-up and maintain consistent line speeds.

It should be readily appreciated by those skilled in the art that many modifications and embodiments of the invention will come to mind to which the invention pertains, having benefit of the teaching presented in the foregoing description and associated drawing. It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

We claim:

1. A device for forming a stuffed proteinaceous patty, comprising:
   a) a first proteinaceous food product dispensing hopper providing a first and a second stream of proteinaceous food product;
   b) an upper conveyor belt traveling in a select direction at a select speed for receiving said first stream of first proteinaceous food product;
   c) a lower conveyor belt for receiving said second stream of first proteinaceous food product travelling parallel to, in the same select direction, and at the same select speed of the upper conveyor;

d) a filling particulate food product dispensing hopper, said filling particulate food product dispensing hopper being in dispensing communication with a variable speed conveyor belt with a first end and a second end where the first end is positioned to receive the filling particulate food product dispensed from the filling particulate food product dispensing hopper and the second end is positioned between said upper and lower conveyors to discharge the filling particulate food product directly onto said second stream of said first proteinacous food product, where the filling particulate food product hopper includes a metering volumetric cleated dispensing cylinder, a first low level sensor and a second high level sensor for detecting the level of filling particulate food product in the hopper to maintain a substantially constant weight pressure thereof on the volumetric cleated dispensing cylinder, said sensors being connected to a hopper volume control system including an ingredient conduit, an in-line vacuum suction module, a solenoid and compressed air source to force the ingredients through the conduit to the hopper when the particulate food product in the hopper is detected at level below a set minimum; and e) a patty forming device for receiving said first stream of said first proteinaceous food product and said second stream of said proteinaceous food product bearing said filling particulate food product where said first and second streams converge and are formed into an integrated patty containing said filling particulate food product.

2. The device of claim 1 where the volumetric cleated dispensing cylinder incorporates a variable pitch system to adjust the outer pitch of the cleats to improve dispensing control accuracy of different size filling particulate ingredients.

3. The device of claim 1 where the filling particulate food product hopper includes a rotating inner scraper positioned to rotate constantly inside the filling particulate food product dispensing hopper.

4. The device of claim 3 where the inner scraper is disposed to rotate peripherally to the volumetric cylinder to minimize bridging of the filling particulate food product above the volumetric cylinder and clumping that may occur over a period of operational time.

5. The device of claim 1 further including a double slotted grind plate for dividing the proteinaceous food product into said first and second streams and where the filling particulate food product is of a size ranging from 4.1-8.2 cc and selected from the group consisting of solid dairy, vegetative, and fungal, a food product.

6. A device for forming a top dressed patty, comprising:

a) a first proteinaceous food product dispensing hopper providing a stream of proteinaceous food product;

b) a constant speed conveyor for receiving said stream of first proteinaceous food product travelling in a select direction and at a select speed;

c) a particulate food product dispensing hopper with a metering volumetric dispensing cylinder, a first low level sensor and a second high level sensor for detecting the level of particulate food product in the hopper to maintain a substantially constant weight pressure thereof on the volumetric dispensing cylinder, said sensors being connected to a hopper volume control system including an ingredient conduit, an in-line vacuum suction module, a solenoid and a compressed air source to force the ingredients through the conduit to the hopper when the particulate food product in the hopper is detected at level below a set minimum;

d) a variable speed conveyor with a first end and a second end where said particulate food product dispensing hopper is in dispensing communication with said first end for receiving the particulate food product dispensed therefrom and the second end is positioned above said constant speed conveyor to discharge the particulate food product directly onto said stream of said first proteinacous food product; and e) a patty forming device for receiving said stream of first proteinaceous food product bearing said particulate food product.

7. The device of claim 6 where the volumetric dispensing cylinder has teeth and incorporates a variable pitch system to adjust the outer pitch of the teeth to improve dispensing control accuracy of particulate food product.

8. The device of claim 6 where the particulate food product hopper includes a rotating inner scraper positioned to rotate constantly inside the hopper.

9. The device of claim 8 where the inner scraper is disposed to rotate peripherally to the volumetric cylinder to minimize clumping and bridging of the particulate food product above the volumetric cylinder.

10. The device of claim 6 where the particulate food product is a second proteinaceous food product.

* * * * *